Patented Nov. 17, 1953

2,659,709

UNITED STATES PATENT OFFICE 2,659,709

STABILIZED VINYLIDENE CHLORIDE COMPOSITIONS

Anthony Fenwick Daglish, Reigate, and Donald Faulkner, Epsom, England, assignors to The Distillers Company Limited, Edinburgh, Scotland, a British company No Drawing. Application July 25, 1951, Serial No. 238,572

Claims priority, application Great Britain August 10, 1950

13 Claims. (Cl. 260—45.95)

The present invention is concerned with the provision of light stabilisers for compositions containing vinylidene chloride polymers and copolymers. The invention provides a composition comprising a vinylidene chloride polymer or copolymer and, as light stabiliser, certain 2-hydroxy-benzophenones.

Polymers and copolymers of vinylidene chloride are capable of being softened under the influence of heat and pressure, and may thus be moulded to form useful articles, whilst some may be extruded and drawn to form useful fibres or filaments. In most cases, such articles or filaments undergo some decomposition when exposed for long periods to the effects of light, especially when such light contains a high proportion of ultra-violet radiation. This decomposition is accompanied by a progressive darkening in colour of the composition, which may change from a practically colourless appearance to dark brown if the action of the radiation is prolonged, at the same time the mechanical properties of the composition undergo deterioration; this change presents a drawback to the use of articles made from the above polymeric materials.

It is important, therefore, to provide stabilisers which will prevent or minimise the darkening effect observed when vinylidene chloride polymers and copolymers are exposed to light. Such stabilisers should preferably be completely compatible with the polymer or copolymer when added in the proportion necessary to provide sufficient protection against exposure, and should impart as little colour as possible to the composition.

It has now been found that a satisfactory degree of protection against the deleterious action of light may be attained by incorporating in the vinylidene chloride polymer or copolymer a hydroxybenzophenone as hereinafter defined as a stabiliser.

The invention comprises the novel products, the specific embodiments of which are described hereinfter by way of example and in accordance with which I now prefer to practice the invention.

Accordingly, the present invention relates to a composition comprising a vinylidene chloride polymer or copolymer and, as stabilising agent therefor, a hydroxybenzophenone of the general formula:

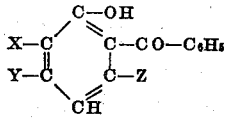

where X and Z are a hydrogen atom or a methyl group and Y is a hydrogen or chlorine atom or a methyl group.

Examples of compounds falling within the above general formula which may be mentioned include 2-hydroxybenzophenone, 2-hydroxy-4-methylbenzophenone, 2-hydroxy-4:6-dimethylbenzophenone, 2-hydroxy-4-chlorobenzophenone, 2-hydroxy-3:4-dimethylbenzophenone, and 2-hydroxy-3:4:6-trimethylbenzophenone.

The amount of said hydroxybenzophenone which may be used is non-critical and it has been found that the use of amounts ranging from 0.5 to 10%, and suitably of 1–5% of the weight of the polymer or copolymer, of the hydroxybenzophenone is satisfactory. Whilst they are not entirely colourless, compositions of vinylidene chloride polymers or copolymers containing 1–5% of the above hydroxybenzophenones possess only a very pale yellow colour.

The hydroxybenzophenones of our invention may be conveniently prepared by the action of anhydrous aluminium chloride on the benzoate of phenol or the appropriate substituted phenol; thus, 2-hydroxybenzophenone may be obtained from phenyl benzoate, 2-hydroxy-4-methylbenzophenone from m-cresyl benzoate, 2-hydroxy-4:6-dimethylbenzophenone from 3:5-xylenyl benzoate, 2-hydroxy-3:4-dimethylbenzophenone from 2:3-dimethylphenylbenzoate, 2-hydroxy-3:4:6-trimethylbenzophenone from 2:3:5-trimethylphenyl benzoate and 2-hydroxy-4-chlorobenzophenone from m-chlorophenyl benzoate. For the purpose of the present invention, it is important that the 2-hydroxybenzophenone derivative used as stabiliser should be free from the corresponding 4-hydroxy-isomer which may be formed concurrently in the above method of preparation since it has been found that compositions of vinylidene chloride polymers or copolymers containing a 4-hydroxybenzophenone derivative tend to darken fairly rapidly on exposure to light. The 2-hydroxybenzophenone derivative may be separated from the 4-hydroxybenzophenone derivative suitably by steam distillation and/or by treatment with dilute sodium hydroxide solutions, in which the 4-hydroxy-isomer is generally more readily soluble.

The 2-hydroxybenzophenone derivative may be mixed with the vinylidene chloride polymer or copolymer in any suitable way. Thus, for example, the stabiliser may be dissolved in a volatile organic solvent, such as acetone or benzene, the solution thoroughly mixed with the powdered polymer or copolymer in any suitable blending machine, and the solvent removed from the resulting composition by drying. If the vinylidene chloride copolymer is capable of being dissolved in an organic solvent, the stabiliser may be added to the said solution to form a homogeneous mixture, and the stabilised composition recovered by evaporation. Alternatively, a solution of the 2-hydroxybenzophenone derivative in a water-miscible organic solvent, such as ethanol, acetone or dioxan, may be added slowly with stirring to an aqueous dispersion of the finely divided vinylidene chloride polymer or copolymer, the resulting uniform polymeric composition separated by filtration or other suitable means, and subsequently dried. According to another alternative, the powdered stabiliser may be mixed with the finely divided polymer or copolymer by mechanical means, as by grinding in a ball mill.

The manner in which the stabilisers of this invention are added to the vinylidene chloride polymer or copolymer is not critical, and the resulting compositions, however prepared, show considerable stability on exposure to sunlight or light containing a high proportion of ultra-violet radiation. Thus, an untreated film or filament of a vinylidene chloride polymer or copolymer may assume a dark brown colour on exposure to sunlight or ultra-violet radiation, whereas a composition containing a comparatively small amount of one of the new stabilisers will resist discolouration for a considerable period when exposed in a similar manner.

The stabilisers may be incorporated in any polymers and copolymers of vinylidene chloride, such for example as vinylidene chloride, polymers, copolymers of vinylidene chloride with monomers such as vinyl chloride, methyl acrylate, ethyl acrylate, methyl methacrylate, ethyl methacrylate, diethyl maleate, vinyl acetate and acrylonitrile, and other copolymers which also show evidence of decomposition when exposed to light in the absence of a stabilising agent. The compositions in which the stabilisers are incorporated suitably contain at least 10% of vinylidene chloride and may also contain, or be compounded with, plasticisers, lubricants, pigments, dyes and the like, used for the purpose of facilitating the processing of the compositions and for providing the required colour in the final article. Other heat- or light- stabilisers used or described in the art may also be present.

The following examples illustrate the practice of the invention. The percentages referred to are by weight unless otherwise indicated.

EXAMPLE 1

A copolymer containing about 12% of vinyl chloride units was prepared from a monomer mixture consisting of 85% of vinylidene chloride and 15% of vinyl chloride, and the finely powdered copolymer was treated with 8% of its weight of alpha-alpha'-diphenyl-diethyl ether as plasticiser in such a manner as to encure a uniform composition. 10-gram portions of the plasticised copolymer were mixed thoroughly with solutions of 0.2 grams of each of the hydroxybenzophenone stabilisers listed in Table I in 5 ml. of acetone, and the acetone then removed by evaporation. The resulting compositions were formed into pellets and extruded from a small ram extruder through an orifice 0.030 inch in diameter, the barrel of the extruder being heated to a temperature of 170–175° C. The filaments so obtained were then drawn by hand so that the diameter was reduced to 0.008 to 0.010 inch. The resulting threads were wound on formers and exposed to light from a carbon arc in a fadeometer. The appearance of the samples after varying periods of exposure is given in Table I. For the purposes of comparison two further 10 gram portions of the plasticised copolymer were treated as described above, one portion containing no stabiliser, and the other portion an equivalent amount of phenyl salicylate. The appearance of these two samples is also given in Table I.

Table I

| Stabilising Agent | Appearance after exposure for— | | |
|---|---|---|---|
| | 20 hours | 50 hours | 100 hours |
| 2-Hydroxybenzophenone. | Unchanged. | Faint line. | Slight darkening. |
| 2-Hydroxy-4-methylbenzophenone. | ...do... | Unchanged. | Very slight darkening. |
| 2-Hydroxy-4:6-dimethylbenzophenone. | ...do... | ...do... | Slight darkening. |
| Blank. | | Brown. | Dark Brown. |
| Phenyl salicylate. | Faint line. | Brown. | Dark brown. |

EXAMPLE 2

A composition consisting of the plasticised copolymer, as described in Example 1, containing 2% of 2-hydroxy-4-methylbenzophenone was formed into a filament as described in Example 1. The filament obtained was exposed in a fadeometer and its light fastness graded by comparison with standard dyeings on cloth exposed simultaneously according to the method described in Specification No. 1006, Part I, issued by the British Standards Institution, and the results obtained are given in Table II.

For the purposes of comparison, three further compositions consisting of the plasticised copolymer as described in Example 1, containing 2% of phenyl salicylate, para-tert-butylphenyl salicylate and 2-hydroxy-5-chlorobenzophenone respectively, were formed into filaments as described above, and the results obtained are also given in Table II.

Table II

| Stabilising Agent | Initial colour of filament | B. S. 1006 grading |
|---|---|---|
| 2-Hydroxy-4-methylbenzophenone. | Very pale yellow. | 5–6 |
| Phenyl salicylate. | Colourless. | 1 |
| p-tert-butylphenyl-salicylate. | ...do... | 1 |
| 2-Hydroxy-5-chlorobenzophenone. | Lemon yellow. | 5–6 |

EXAMPLE 3

Three compositions, each consisting of the plasticised copolymer as described in Example 1 and containing 2% of the hydroxybenzophenone listed in Table III below, were formed into filaments as described in Example 1. These filaments were exposed to light from a carbon arc in a fadeometer together, for the purposes of comparison, with a further composition consisting of the plasticised copolymer as described in Example 1 but containing no stabiliser also formed into a filament as described in Example 1. The time required for the filaments to reach the degree of degradation reached by the comparative filament in 50 hours exposure, as estimated visually by the depth of brown colour, is given in Table III below.

Table III

| Stabilising Agent | Time of exposure in hours |
|---|---|
| 2-Hydroxy-3:4-dimethylbenzophenone. | 540 |
| 2-Hydroxy-3:4:6-trimethylbenzophenone. | 375 |
| 2-Hydroxy-4-chlorobenzophenone. | 280 |

EXAMPLE 4

The process of Example 2 was repeated using in place of the copolymer employed therein a copolymer prepared from a monomer mixture consisting of 90% of vinylidene chloride and 10% of vinyl chloride, which copolymer was finely powdered and then treated with 8% of its weight of alpha-alpha'-diphenyl-diethyl ether as plasticiser, in such a manner as to ensure a uniform composition. The results obtained were substantially the same as those quoted in Example 2.

EXAMPLE 5

The process of Example 1 was repeated using in place of the copolymer employed therein a polymer consisting of vinylidene chloride, which polymer was finely powdered and then treated with 8% of its weight of alpha-alpha'-diphenyl-diethyl ether as plasticizer, in such a manner as to ensure a uniform composition. The results obtained were substantially the same as those quoted in Example 1.

EXAMPLE 6

The process of Example 4 was repeated with the exception that in place of the copolymer employed therein a copolymer consisting of 84% vinylidene chloride, 14% vinyl chloride and 2% of methyl maleate or a copolymer consisting of 84% vinylidene chloride, 14% vinyl chloride and 2% of ethyl maleate was employed. The results obtained were substantially the same as those quoted in Example 2.

EXAMPLE 7

The process of Example 5 was repeated using in place of the polymer employed therein a copolymer consisting of 84% vinylidene chloride, 14% vinyl chloride and 2% of vinyl acetate. The results obtained were substantially the same as those quoted in Example 1.

The process of the preceding examples may be repeated using in place of the polymers or copolymers employed therein other copolymers of vinylidene chloride and vinyl chloride containing at least 10% of vinylidene chloride and preferably at least 70% of vinylidene chloride, or copolymers of vinylidene chloride with other monomers such as methyl acrylate, ethyl acrylate, methyl methacrylate, vinyl acetate, acrylonitrile and the like containing at least 10% of vinylidene chloride and preferably at least 70% of vinylidene chloride.

The hydroxybenzophenone stabilising agent when used in amount in excess of about 5% by weight of the polymer or copolymer exert a plasticising effect on the polymer or copolymer, and their use for this purpose is included as part of the present invention.

We claim:

1. A composition of matter comprising a polymer in which one polymerised ingredient is vinylidene chloride and as stabilising agent a hydroxybenzophenone of the general formula:

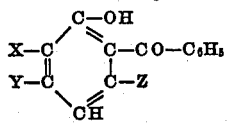

wherein X and Z are selected from the group consisting of hydrogen and methyl radicals and Y is selected from the group consisting of hydrogen, methyl and chlorine radicals.

2. A composition as claimed in claim 1, wherein the hydroxybenzophenone is present in an amount between 0.5 and 10% of the weight of the polymer.

3. A composition as claimed in claim 1, wherein the polymer consists essentially of vinylidene chloride.

4. A composition as claimed in claim 1, wherein the polymer is a copolymer of vinylidene chloride and another polymerisable monomer.

5. A composition as claimed in claim 4, wherein the polymer is a copolymer of vinylidene chloride and vinyl chloride.

6. A composition as claimed in claim 1, in which the stabilising agent is 2-hydroxybenzophenone.

7. A composition as claimed in claim 1, in which the stabilising agent is 2-hydroxy-4-methyl-benzophenone.

8. A composition as claimed in claim 1, in which the stabilising agent is 2-hydroxy-4:6-dimethyl-benzophenone.

9. A composition as claimed in claim 1, in which the stabilising agent is 2-hydroxy-3:4-dimethylbenzophenone.

10. A composition as claimed in claim 1, in which the stabilising agent is 2-hydroxy-3:4:6-trimethylbenzophenone.

11. A copolymer of vinylidene chloride and vinyl chloride stabilised with from 0.5 to 10% of its weight of a hydroxybenzophenone of the general formula:

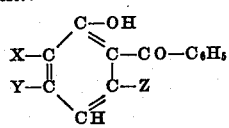

wherein X and Z are selected from the group consisting of hydrogen and methyl radicals and Y is selected from the group consisting of hydrogen, methyl and chlorine radicals.

12. A composition of matter comprising a polymer which contains at least 10 percent by weight of vinylidene chloride and as stabilising agent a hydroxybenzophenone of the general formula:

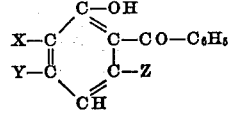

wherein X and Z are selected from the group consisting of hydrogen and methyl radicals and Y is selected from the group consisting of hydrogen, methyl and chlorine radicals.

13. A copolymer of vinylidene chloride and vinyl chloride stabilized with from 0.5 to 10% of its weight of 2-hydroxy-4-methyl-benzophenone.

ANTHONY FENWICK DAGLISH.
DONALD FAULKNER.

References Cited in the file of this patent

UNITED STATES PATENTS

| Number | Name | Date |
|---|---|---|
| 2,434,496 | Houtman | Jan. 13, 1948 |